United States Patent
Cui et al.

(10) Patent No.: US 8,811,147 B2
(45) Date of Patent: Aug. 19, 2014

(54) METHOD FOR ALLOCATING DOWNLINK TRANSMISSION POWER OF COORDINATED TRANSMISSION DEVICES IN COORDINATED MULTI-POINT TRANSMISSION SYSTEM

(75) Inventors: Qimei Cui, Beijing (CN); Ping Zhang, Beijing (CN); Xiaofeng Tao, Beijing (CN); Bing Luo, Beijing (CN); Alexis Dowhuszko, Beijing (CN); Jyri Hamalainen, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 47 days.

(21) Appl. No.: 13/553,973

(22) Filed: Jul. 20, 2012

(65) Prior Publication Data

US 2013/0329650 A1  Dec. 12, 2013

(30) Foreign Application Priority Data

Jun. 11, 2012 (CN) .......................... 2012 1 0191323

(51) Int. Cl.
*H04L 5/12* (2006.01)
*H04J 3/00* (2006.01)
(52) U.S. Cl.
USPC .......................................... 370/215; 370/464
(58) Field of Classification Search
None
See application file for complete search history.

(56) References Cited

U.S. PATENT DOCUMENTS

| 2010/0225173 A1* | 9/2010 | Aoyama et al. ................ 307/104 |
| 2012/0289275 A1* | 11/2012 | Li et al. .......................... 455/513 |
| 2013/0083681 A1* | 4/2013 | Ebrahimi Tazeh Mahalleh et al. ............................. 370/252 |

FOREIGN PATENT DOCUMENTS

WO   WO 2011085516 A1 *  7/2011   ............... H04B 7/02

* cited by examiner

*Primary Examiner* — Omar Ghowrwal
(74) *Attorney, Agent, or Firm* — Buchanan Ingersoll & Rooney PC

(57) ABSTRACT

A method for allocating downlink transmission power of coordinated transmission devices in coordinated multi-point transmission system includes the coordinated transmission devices receiving feedback of channel state information of sub-channels occupied by a terminal from the terminal. The channel state information includes channel phase information and channel amplitude information. Each of the coordinated transmission devices adjusts phases of their sending signals over its sub-channels respectively so as to make phase difference of the sending signals, which are received by the terminal from the coordinated transmission devices via a same sub-channel, to be minimal. Each of the coordinated transmission devices determines its power allocation proportions for the sub-channels on the basis of feedback of channel amplitude information from the terminal and the adjusted phases of the sending signals. By adapting coordinate Iterative Water filling Power Allocation Algorithm with low complexity, the capacity of the system is increased.

13 Claims, 6 Drawing Sheets

METHOD FOR ALLOCATING DOWNLINK TRANSMISSION POWER OF COORDINATED TRANSMISSION DEVICES IN COORDINATED MULTI-POINT TRANSMISSION SYSTEM

FIELD OF THE INVENTION

The invention relates to coordinated transmission technology in wireless communication field, and more particularly relates a method for allocating downlink transmission power of coordinated transmission devices in a coordinated multi-point transmission system.

BACKGROUND OF THE INVENTION

As a technology with a wide prospect for LTE-Advanced at present, Coordinated Multiple Point (hereafter referred to as CoMP) transmission technology requires a highly efficient wireless resource managing method to arrange allocation of various wireless resources efficiently and properly. Orthogonal Frequency Division Multiplexing (hereafter referred to as OFDM) technology, by using orthogonal modulated signal, provides higher spectrum efficiency, is robust to frequency selective fading and becomes one kind of important application technology in the broadband wireless communication system in future.

For new challenges are brought to resource allocation by OFDM CoMp-JP system; conventional way of resource allocation can't meet the needs of the new system. On one hand, due to joint transmission of multiple transmission points, allocation dimension of sub-channels and power is increased over carrier of a given user; therefore, compared with conventional multiple antenna technology, multiple OFDM sub-channels from different transmission points to a same user are different in path loss, shadowing fading and fast fading. On the other hand, each coordinated transmission point is restrained by maximum transmission power.

Coordinated technology will be one kind of key technology for 4G network in future. In multiple points of CoMp technology research, it is necessary to propose a method for allocating downlink transmission power for CoMP environment, which approaches Shannon information capacity as possible, to solve the problem described above.

SUMMARY OF THE INVENTION

One of technical problems solved by the invention is that it is necessary to provide a method for allocating downlink transmission power of coordinated transmission device in a coordinated multi-point transmission system which can perform power allocation in Coordinated multiple point Environment.

To solve the above problems, the invention provides a method for allocating downlink transmission power of coordinated transmission devices in coordinated multi-point transmission system. The method comprising:

Step S10, the coordinated transmission devices receiving feedback of channel state information of sub-channels occupied by a terminal from the terminal, wherein the channel state information includes channel phase information and channel amplitude information, and the coordinated transmission device is for providing wireless access for the terminal in the coordinated multi-point transmission system;

Step S20, each of the coordinated transmission devices adjusts phases of their sending signals over its sub-channels respectively so as to make phase difference of the sending signals, which are received by the terminal from the coordinated transmission devices via a same sub-channel, to be below a predetermined value so as to be minimal; and Step S30, each of the coordinated transmission devices determine its power allocation proportions for the sub-channels on the basis of feedback of channel amplitude information from the terminal and the adjusted phases of the sending signals.

According another aspect of the invention, Step 20 further comprises:

taking one of the coordinated transmission devices as a reference device, wherein the reference device keeps the phases of sending signals to be constant;

other coordinated transmission devices except for the reference device adjusting the phase of their sending signals over the sub-channels so as to make the phase difference of the sending signals, which are received by the terminal from the coordinated transmission devices via a same sub-channel, to be below a predetermined value so as to be minimal.

According another aspect of the invention, other coordinated transmission devices except for the reference device determine the phase adjustment quantity of their sending signals over sub-channel m by using the following formula:

$$\hat{\phi}_K^{(m)} = \arg\min_{\phi_K^{(m)} \in \rho_m} |[\varphi_A^{(m)} - \varphi_K^{(m)}] - \phi_K^{(m)}|,$$

$$m = 1, \ldots, M$$

where, $$\rho_m = \frac{2n-1}{2^{N_P}}\pi,$$

$$n = 1, 2, \ldots, 2^{N_P}$$

and $\rho_m$ is a quantized phase set; $N_p$ is a bit number of the feedback of phase information over the sub-channels; $\phi_A^{(m)}$ represents channel phase of reference device A over sub-channel m, $\phi_K^{(m)}$ represents channel phase over the sub-channel m of any coordinated transmission device K except for the reference device A, m is a sequence number of a sub-channel; M is the number of sub-channels; $\hat{\phi}_K^{(m)}$ is the phase adjustment quantity of sending signal over sub-channel m of coordinated transmission device K; arg min represents the value of $\phi_K^{(m)}$ which makes the function value to be below a predetermined value so as to be a minimum.

According another aspect of the invention, in Step 30, when the bit number of the feedback of the phase information of the sub-channels is zero, each of the coordinated transmission devices determine its power allocation proportions for its sub-channels by steps as follows:

Step 311, each of the coordinated transmission devices performing equal power allocation on its sub-channels so as to determine power allocation proportions of each of its sub-channels.

Step 312, each of the coordinated transmission devices in turn redetermining their power allocation proportions for its sub-channels, on the basis of current power allocation proportions for the sub-channels of other coordinated transmission devices and the feedback of channel amplitude information from the terminal.

Step 313, for each of the coordinated transmission devices, determining whether its power allocation proportions satisfy a predefined convergence condition, if all of the coordinated transmission devices satisfy the predefined convergence condition, Step 30 ends, otherwise, going back to Step 312 to perform next iteration.

According another aspect of the invention, Step 312 further specifically comprises each of the coordinated transmission devices determining its power allocation proportions for the sub-channels by the following expression:

$$u_K^{(m)} = \arg\max C$$

where the coordinated transmission device K refers to any one of the coordinated transmission devices;

$u_K^{(m)}$ represents power allocation proportion of coordinated transmission device K for sub-channel m, m is a sequence number of the sub-channels;

C represents throughput sent to the terminal by all of the coordinated transmission devices via sub-channel m and is a function of variable $u_K^{(m)}$ including following parameters: feedback of channel amplitude gain of sub-channel m from the terminal, current power allocation proportions for sub-channel m of other coordinated transmission devices except for coordinated transmission device K; arg max represents value of $u_K^{(m)}$ when the function value is maximum; and for any coordinated transmission device, the sum of power allocation proportions for its sub-channels equals 1, and the power allocation proportion for any sub-channel is greater than or equal to 0.

According another aspect of the invention, when the number of the coordinated transmission devices is 2, Step 312 specifically comprises coordinated transmission device A being any one of the two coordinated transmission devices and determining its power allocation proportion for its sub-channels by the formula as follows:

$$u_A^{(m)} = \arg\max \sum_{m=1}^{M} \log_2(1 + u_A^{(m)}\gamma_{eA}^{(m)} + u_B'^{(m)}\gamma_{eB}^{(m)}),$$

the other coordinated transmission device B determining its power allocation proportion for its sub-channels by the formula as follows:

$$u_B^{(m)} = \arg\max \sum_{m=1}^{M} \log_2(1 + u_B^{(m)}\gamma_{eB}^{(m)} + u_A^{(m)}\gamma_{eA}^{(m)}),$$

where $$u_B^{(m)} \geq 0, \sum_{m=1}^{M} u_B^{(m)} = 1, u_A^{(m)} \geq 0, \sum_{m=1}^{M} u_A^{(m)} = 1$$

$u_A^{(m)}$ represents the power allocation proportion for sub-channel m of coordinated transmission device A determined by executing Step 312 this time, $u_B^{(m)}$ and $u'_B^{(m)}$ respectively represent the power allocation proportion for sub-channel m of coordinated transmission device B determined by executing Step 312 and the power allocation proportion for sub-channel m of coordinated transmission device B before executing Step 312;

$$\gamma_{eA}^{(m)} = \frac{P_{Tx}}{N_0}\gamma_A^{(m)}, \gamma_{eB}^{(m)} = \frac{P_{Tx}}{N_0}\gamma_B^{(m)},$$

$\gamma_A^{(m)}$ and $\gamma_B^{(m)}$ respectively represent channel power gain; $P_{Tx}$ is transmission power of the coordinated transmission devices; $N_0$ represents noise power value over each sub-channel.

According another aspect of the invention, the solution of $u_A^{(m)}$ of claim 6 is obtained by solving the equation as follows:

$$\min - \sum_{m=1}^{M} \log_2(\alpha^{(m)} + x^{(m)})$$

$$\alpha^{(m)} = \frac{1 + u_B'^{(m)}\gamma_{eB}^{(m)}}{\gamma_{eA}^{(m)}} > 0$$

$$\text{s.t. } x^{(m)} \geq 0, \sum_{m=1}^{M} x^{(m)} = 1$$

And the solution of $u_B^{(m)}$ of claim 6 is obtained by solving the equation as follows:

$$\min - \sum_{m=1}^{M} \log_2(\beta^{(m)} + y^{(m)})$$

$$\beta^{(m)} = \frac{1 + u_A^{(m)}\gamma_{eA}^{(m)}}{\gamma_{eB}^{(m)}} > 0$$

$$\text{s.t. } y^{(m)} \geq 0, \sum_{m=1}^{M} y^{(m)} = 1$$

where min represents minimizing the objective function, $x^{(m)}$ and $y^{(m)}$ respectively represent the power allocation proportions for sub-channel m of coordinated transmission device A and coordinated transmission device B.

According another aspect of the invention, in Step 30, when the bit number of the feedback of the phase information of the sub-channels is zero, the power allocation proportions for the sub-channels of the coordinated transmission devices are determined by steps as follows:

Step 321, each of the coordinated transmission devices performing equal power allocation on its sub-channels so as to determine its power allocation proportions for the sub-channels.

Step 322, each of the coordinated transmission devices in turn determining their power allocation proportions for the sub-channels, on the basis of power allocation proportions for the sub-channels of other coordinated transmission devices before performing Step 322 this time, feedback of channel amplitude information from the terminal and the adjusted phase of sending signals.

Step 323, for each of the coordinated transmission devices, determining whether its power allocation proportions satisfy the predefined convergence condition respectively, if all of the coordinated transmission devices satisfy the predefined convergence condition, Step 30 ends; otherwise, go back to Step 322 for performing next iteration.

According another aspect of the invention, Step 322 specifically further comprises coordinated transmission device K, which is any one of the coordinated transmission devices, redetermining its power allocation proportion for the sub-channels by the following process:

determining $\tilde{u}_K^{(m)}$ by the following expression:

$$\tilde{u}_K^{(m)} = \arg\max C,$$

then performing convergence on $\tilde{u}_K^{(m)}$ according to the defined expression so as to determine power allocation proportions for the sub-channels of coordinated transmission device K, where m is a sequence number of the respective channels, C represents throughput sent to the terminal via sub-channel m and is a function of variable $\tilde{u}_K^{(m)}$ including following parameters: feedback of channel amplitude gain of sub-channel m from the terminal, power allocation proportions for sub-channel m of other coordinated transmission devices except for coordinated transmission device K before performing Step 322 and the adjusted phase of sending signals; and $$\sum_{m}^{M} \tilde{u}_K^{(m)} = 1$$

and $\tilde{u}_K^{(m)} \geq 0$.

According another aspect of the invention, when the number of coordinated transmission devices is 2, the expression in claim 9 specifically further comprises $$\tilde{u}_A^{(m)} = \operatorname{argmax} \sum_{m=1}^{M} \log_2 \left( 1 + \tilde{u}_A^{(m)} \gamma_{eA}^{(m)} + u_B^{\prime(m)} \gamma_{eB}^{(m)} + 2\sqrt{\tilde{u}_A^{(m)}} \sqrt{\gamma_{eA}^{(m)}} \sqrt{u_B^{\prime(m)}} \sqrt{\gamma_{eB}^{(m)}} c_{N_p} \right)$$

where $$\tilde{u}_A^{(m)} \geq 0, \sum_{m=1}^{M} \tilde{u}_A^{(m)} = 1$$

and the coordinated transmission device A is any one of the two coordinated transmission devices; $u_B^{\prime(m)}$ represents the power allocation proportion for sub-channel m of coordinated transmission device B determined before executing Step 322 this time, is the value of to be determined by executing Step 322 this time;

$$\gamma_{eA}^{(m)} = \frac{P_{Tx}}{N_0} \gamma_A^{(m)},$$

$$\gamma_{eB}^{(m)} = \frac{P_{Tx}}{N_0} \gamma_B^{(m)},$$

$\gamma_A^{(m)}$ and $\gamma_B^{(m)}$ respectively represent channel power gain; $P_{Tx}$ is transmission power of respective coordinated transmission devices; $c_{N_p}$ is a function including parameter of adjusted phase of sending signals, $$c_{N_p} = E\left(\cos\left(\varphi_A^{(m)} - \varphi_B^{(m)} - \hat{\phi}^{(m)}\right)\right) = \frac{2^{N_p}}{\pi} \sin\left(\frac{\pi}{2^{N_p}}\right),$$

$N_0$ represents noise power value over each sub-channel.

According another aspect of the invention, the solution of $\tilde{u}_A^{(m)}$ of claim 10 is obtained by solving the equation as follows:

$$\min - \sum_{m=1}^{M} \log_2(\alpha^{(m)} + x^{(m)})$$

$$\alpha^{(m)} = \frac{1 + u_B^{\prime(m)} \gamma_{eB}^{(m)} + \sqrt{u_A^{\prime(m)} u_B^{\prime(m)}} \sqrt{\gamma_{eA}^{(m)} \gamma_{eB}^{(m)}} c_{N_p}}{\gamma_{eA}^{(m)} + \sqrt{\frac{u_B^{\prime(m)}}{u_A^{\prime(m)}}} \sqrt{\gamma_{eA}^{(m)} \gamma_{eB}^{(m)}} c_{N_p}} > 0$$

where $$x^{(m)} \geq 0, \sum_{m=1}^{M} x^{(m)} = 1,$$

and coordinated transmission device A is any one of the two coordinated transmission devices; $u_A^{\prime(m)}$ and $u_B^{\prime(m)}$ respectively are the power allocation proportions for sub-channel m of coordinated transmission devices A and B before executing Step 322 this time; $x^{(m)}$ represents the value of which is determined by executing Step 322 this time, min represents minimizing the objective function.

According another aspect of the invention, Step 322 further comprises performing convergence on $\tilde{u}_K^{(m)}$ according to a defined expression so as to determine power allocation proportions for the sub-channels of coordinated transmission device K:

$$u_K^{(m)} = u_K^{\prime(m)} + \delta(\tilde{u}_K^{(m)} - u_K^{\prime(m)})$$

where $u_K^{(m)}$ represents power allocation proportion for the mth sub-channel of coordinated transmission device K, $u_K^{\prime(m)}$ represents power allocation proportion for the sub-channel of coordinated transmission device K which is determined before executing Step 322 this time, δ is a convergence factor which is less than 1.

According another aspect of the invention, the value of $u_K^{(m)}$ is determined by water filling theory and the value of $\tilde{u}_K^{(m)}$ is determined by Taylor formula and water filling theory.

According another aspect of the invention, the predefined convergence condition is $$\max_{m \in \{1, \ldots, M\}} \{|u^{(m)} - u^{\prime(m)}|\} \leq \varepsilon$$

where ε represents error tolerance limit defined for power allocation proportion, $u^{(m)}$ represents current power allocation proportion for sub-channel m of a coordinated transmission device; $u^{\prime(m)}$ represents power allocation proportion for sub-channel m, which is determined before executing Step 312 or Step 322 this time; || represents Modular operation.

Compared with the prior art, one or more embodiments of the present invention have the following advantages:

By adapting coordinate Iterative Water filling Power Allocation Algorithm with low complexity, the invention fills the gap of power allocation algorithm in CoMP environment and takes advantage of CoMP effectively. Thus the capacity of the system is increased.

Other characteristics and advantages of the present invention will be discussed in the subsequent description, and will become more apparent partly from the description or may be learned by the practice of the invention. The objects and other advantages of the invention may be realized and obtained by means of the structures particularly pointed out in the description, appended claims and appended drawings.

BRIEF DESCRIPTION OF THE DRAWINGS

The accompanying drawings which are intended to provide a further understanding of the invention and constitute a part of this specification, together with the description serve to explain the principles of the invention without limiting the scope of the invention as claimed. In the drawings:

DETAILED DESCRIPTION OF THE PREFERRED EMBODIMENTS OF THE INVENTION

The embodiments of the present invention will be illustrated in detail below in combination with the accompanying drawings and embodiments, so as to It can be fully understood how the present invention uses technical means to solve the technical problem and the process of achieving the technical effects and implement it. It should noted that, if there is no conflict, the embodiments of the present invention and the technical features in the embodiments can be combined with each other so that the technical solutions formed by their combinations fall within the scope of the present invention.

Embodiment 1

Figure 1:
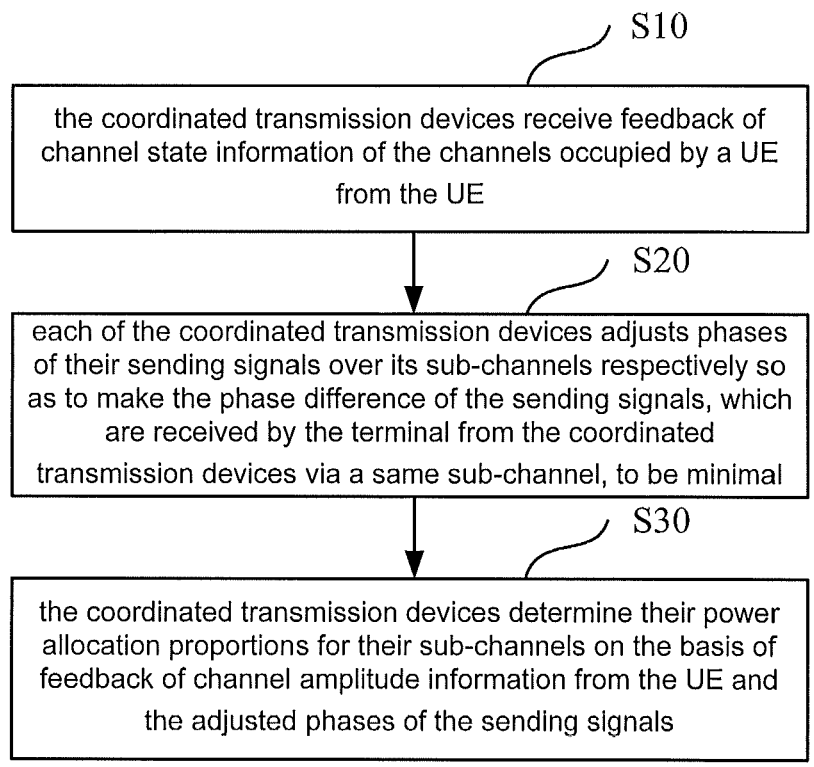
FIG. 1 is a flow diagram showing a method for allocating downlink transmission power in a coordinated multi-point transmission system according to Embodiment 1 of the present invention.

FIG. 1 is a flow diagram showing a method for allocating downlink transmission power in a coordinated multi-point transmission system according to Embodiment 1 of the present invention. Referring to FIG. 1, steps of Embodiment 1 is illustrated in the following.

In Embodiment 1, at least two or more coordinated transmission devices provide coordinated transmission service to a terminal.

Step S10, the coordinated transmission devices receive feedback of channel state information of channels occupied by a terminal from the terminal, in which the channel state information includes channel phase information and channel amplitude information.

The coordinated transmission device, also called Coordinated Transmission Point (hereafter referred to as CTP), is a device which is a base station, Node B, or RRH, and the like, for providing wireless access for the terminal in the coordinated multi-point transmission system.

Step S20, each of the coordinated transmission devices adjusts phases of sending signals over the sub-channels respectively, so as to make the phase difference of the sending signals received by the terminal from coordinated transmission devices over a same sub-channel, to be minimal.

Specifically, one of the coordinated transmission devices may be taken as a reference device. The reference device keeps the phases of sending signals to be constant; other coordinated transmission devices except for the reference device adjust the phase of their sending signals over sub-channels so as to make the phase difference of the sending signals, which are received by the terminal from coordinated transmission devices via a same sub-channel, to be minimal. By the step, the terminal can merge received signals more efficiently, so as to increase the signal-to-noise ratio of the received signals.

Other coordinated transmission devices except for the reference device can determine the phase adjustment quantity of their sending signals over sub-channel m by using the following formula:

$$\hat{\phi}_K^{(m)} = \arg\min_{\phi_K^{(m)} \in \rho_m} |[\varphi_A^{(m)} - \varphi_K^{(m)}] - \phi_K^{(m)}|,$$

$$m = 1, \ldots, M,$$

where, $$\rho_m = \frac{2n-1}{2^{N_P}}\pi,$$

$$n = 1, 2, \ldots, 2^{N_P}$$

and $\rho_m$ is quantized phase set; $N_p$ is the bit number of the feedback of phase information for sub-channels, which is defined according to a communication protocol or a communication standard; arg min represents the value of $\phi_K^{(m)}$ which makes the function value to be minimum; $\phi_A^{(m)}$ represents channel phase set of sub-channel by the reference device A, $\phi_K^{(m)}$ represents channel phase for sub-channel m of any coordinated transmission device K except for the reference device m is a sequence number of sub-channel; M is the number of sub-channels; $\hat{\phi}_K^{(m)}$ is the phase adjustment quantity of sending signals over sub-channel m of coordinated transmission device K.

Step S30, each of the coordinated transmission devices determines its power allocation proportions for its sub-channels on the basis of the feedback of channel amplitude information from the terminal and the adjusted phases of the sending signals.

Figure 2A:
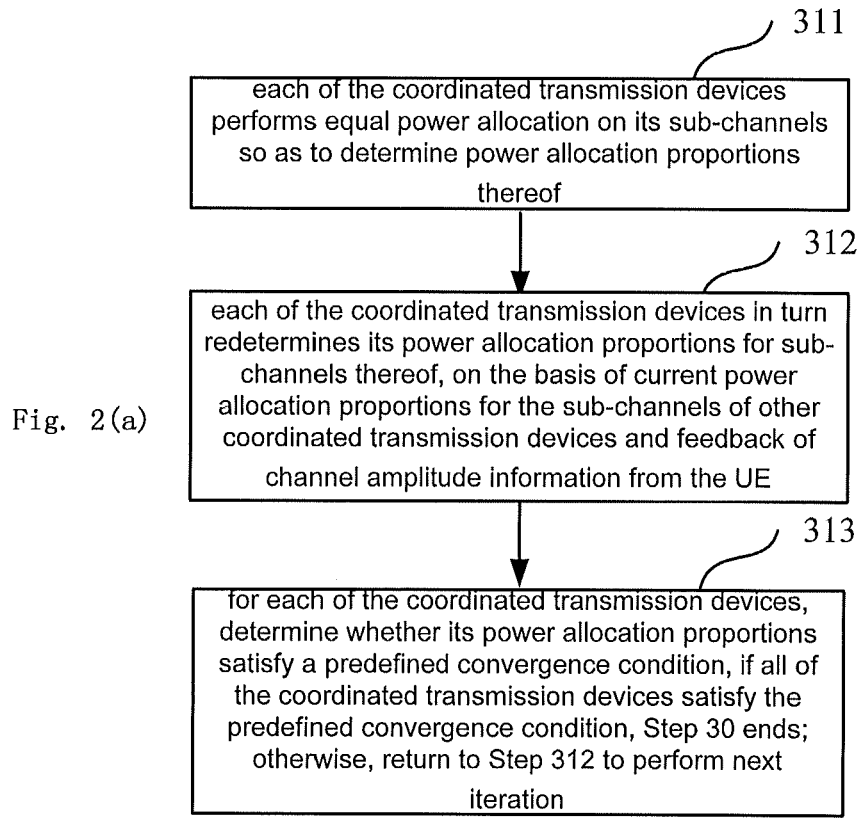
FIG. 2(a) and FIG. 2(b) are flow diagrams showing a method for allocating downlink transmission power according to the first case and the second case of Embodiment 1 of the present invention respectively.
Figure 2B:
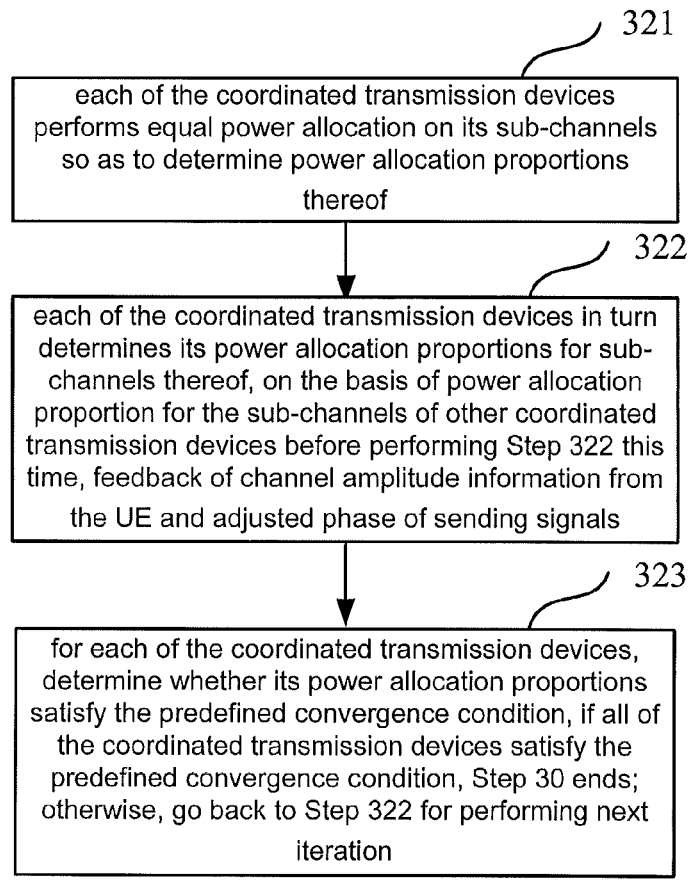

Specifically, according to bit number of the feedback of phase information over the sub-channels, the present embodiment is discussed in two cases: the first case and the second case. For details, please refer to FIG. 2(a) and FIG. 2(b).

In the first case, when the number of feedback bit number of the feedback of the phase information of the sub-channels is zero, each of the coordinated transmission devices determine their power allocation proportions for each of its sub-channels by steps as follows respectively:

Step 311, each of the coordinated transmission devices performs equal power allocation on its sub-channels so as to determine power allocation proportions for each of its sub-channels.

Specifically, in the setting of N coordinated transmission devices and a terminal occupied M sub-channels, let $$u_1^{(m)} = \frac{1}{M}, u_2^{(m)} = \frac{1}{M} \ldots u_n^{(m)} = \frac{1}{M},$$

m=1, ..., M, n=1 ... N, where n represents a sequence number of a coordinated transmission device, m represents a sequence number of a sub-channel; M represents the number of the sub-channels; $u_n^{(m)}$ represents power allocation proportion for sub-channel m of coordinated transmission device n.

Step 312, each of the coordinated transmission devices in turn redetermines the power allocation proportions for its sub-channels based on the feedback of channel amplitude information from the terminal and current power allocation proportions for the sub-channels of other coordinated transmission devices.

At first, redetermine the power allocation proportion $u_1^{(m)}$ for sub-channel m of the first coordinated transmission device by using current power allocation proportions for sub-channel m, referred as $u_2^{(m)}$, $u_3^{(m)}$, $u_N^{(m)}$, of other coordinated transmission devices except for the first coordinated transmission device. At that time, the power allocation proportions for sub-channel m of other coordinated transmission device are not redetermined, therefore, the current power allocation proportions for sub-channel m of other coordinated transmission devices is the power allocation proportions before executing Step 312. It should be noted that, if Step 312 is executed for the first time, the current power allocation proportions for sub-channels of other coordinated transmission devices are the power allocation proportions determined in Step 311, otherwise, the current power allocation proportions is the power allocation proportions determined by executing Step 312 last time.

Then, redetermine the power allocation proportion $u_2^{(m)}$ for sub-channel m of the second coordinated transmission device. at that time, since the power allocation proportion for sub-channel m of the first coordinated transmission device has been redetermined just now, therefore, when the second coordinated transmission device redetermines power allocation proportions for its sub-channels on the basis of current power allocation proportions for sub-channels of other coordinated transmission devices and feedback of channel amplitude information from the terminal, the basis is the power allocation proportions for sub-channels of the first coordinated transmission device redetermined just now and the current power allocation proportions of the third to Nth coordinated transmission devices (at that time, for the third to Nth coordinated transmission devices, the current power allocation proportions of them are the proportions determined in Step 311 since Step 312 is executed for the first time), and feedback of channel amplitude information from the terminal.

Specifically, the Step 312 further includes that each of the coordinated transmission devices can determine its power allocation proportions for its sub-channels by the following expression:

$$u_K^{(m)} = \arg\max C$$

where coordinated transmission device K refers to any one of the coordinated transmission devices;

$u_K^{(m)}$ represents power allocation proportion for sub-channel m of coordinated transmission device K, m is the sequence number of the sub-channels;

C represents throughput sent to the terminal by all of the coordinated transmission devices via sub-channel m and is a function of variable $u_K^{(m)}$ including following parameters: channel amplitude gain of sub-channel m feedback from the terminal, current power allocation proportions for sub-channel m of other coordinated transmission devices except for coordinated transmission device K; arg max represents value of $u_K^{(m)}$ when the function value is maximum; and for any coordinated transmission device, the sum of power allocation proportions for its sub-channels equals 1, and the power allocation proportion for any sub-channel is greater than or equal to 0. Performing power allocation according to the above expression may take advantage of coordinated multiple point technology effectively and improves the capacity of the system.

By using water filling theory to determine the value of $u_K^{(m)}$, the complexity of the calculation is reduced due to the above coordinate Iterative Water filling Power Allocation Algorithm described above.

Step 313, for each of the coordinated transmission devices, determine whether the power allocation proportions of it satisfy a predefined convergence condition, if all of the coordinated transmission devices satisfy the predefined convergence condition, Step 30 ends; otherwise, go back to Step 312 to perform next iteration.

In the second case, when the bit number of the feedback of phase information of each sub-channel is not zero, the power allocation proportions for the sub-channels of the coordinated transmission devices are determined by steps as follows:

Step 321, each of the coordinated transmission devices performs equal power allocation on its sub-channels so as to determine power allocation proportions for each of its sub-channels. Step 321 is same as Step 311 above and no further detail is given here.

Step 322, each of the coordinated transmission devices in turn determines its power allocation proportions for its sub-channels, on the basis of power allocation proportions for sub-channels of other coordinated transmission devices before performing Step 322 this time, feedback of channel amplitude information from the terminal and adjusted phase of sending signals.

Specifically, Step 322 further includes that, for coordinated transmission device K, which can be any one of the coordinated transmission devices, its power allocation proportions for the sub-channels is redetermined by the following process:

$\tilde{u}_K^{(m)}$ is determined by the following expression:

$$\tilde{u}_K^{(m)} = \arg\max C$$

then perform convergence on $\tilde{u}_K^{(m)}$ according to the defined expression so as to determine power allocation proportions for the sub-channels of coordinated transmission device K.

In this case, m is the sequence number of a sub-channel, C represents throughput sent to the terminal from all of the coordinated transmission devices via sub-channel m and is a function of variable $\tilde{u}_K^{(m)}$ including following parameters: feedback of channel amplitude gain of sub-channel m from the terminal, power allocation proportions for sub-channel m of other coordinated transmission devices except for coordinated transmission device K before performing Step 322 this time and the adjusted phase of sending signals; and $$\sum_{m}^{M} \tilde{u}_K^{(m)} = 1$$

and $\tilde{u}_K^{(m)} \geq 0$.

Specifically, Step 322 further includes performing convergence on $\tilde{u}_K^{(m)}$ according to the defined expression so as to determine power allocation proportion for the sub-channels of coordinated transmission device K:

$$u_K^{(m)} = u'_K^{(m)} + \delta(\tilde{u}_K^{(m)} - u'_K^{(m)})$$

where $u_K^{(m)}$ represents power allocation proportion for the sub-channel m of coordinated transmission device K, $u'_K^{(m)}$ represents power allocation proportion K for sub-channel m of the coordinated transmission device K which is determined before executing Step 322 this time, $\delta$ is a convergence factor which is less than 1.

The key point should be noted is that the value of $\tilde{u}_K^{(m)}$ can be determined by Taylor formula and water filling theory.

Step 323, for each of the coordinated transmission devices, determine whether its power allocation proportions satisfy the predefined convergence condition, if all of the coordinated transmission devices satisfy the predefined convergence condition, Step 30 ends; otherwise, go back to Step 322 for performing next iteration.

In this case, the predefined convergence condition in Step 313 and Step 323 is:

$$\max_{m \in \{1, \ldots, M\}} \{|u_K^{(m)} - u'^{(m)}_K|\} \leq \varepsilon$$

In this case, $\varepsilon$ represents error tolerance limit defined for power allocation proportion, $u^{(m)}$ represents current power allocation proportion for sub-channel m of a coordinated transmission device; $u'^{(M)}_K$ represents power allocation proportion for sub-channel m of coordinated transmission device K, which is determined before executing Step 312 or Step 322 this time; || represents Modular operation.

By adapting the coordinate Iterative Water filling Power Allocation Algorithm with low complexity, the present embodiment performs power allocation for downlink transmission channels in CoMP environment and takes advantage of coordinated multiple point technology, so as to improve the capacity of the system.

Embodiment 2

Figure 3:
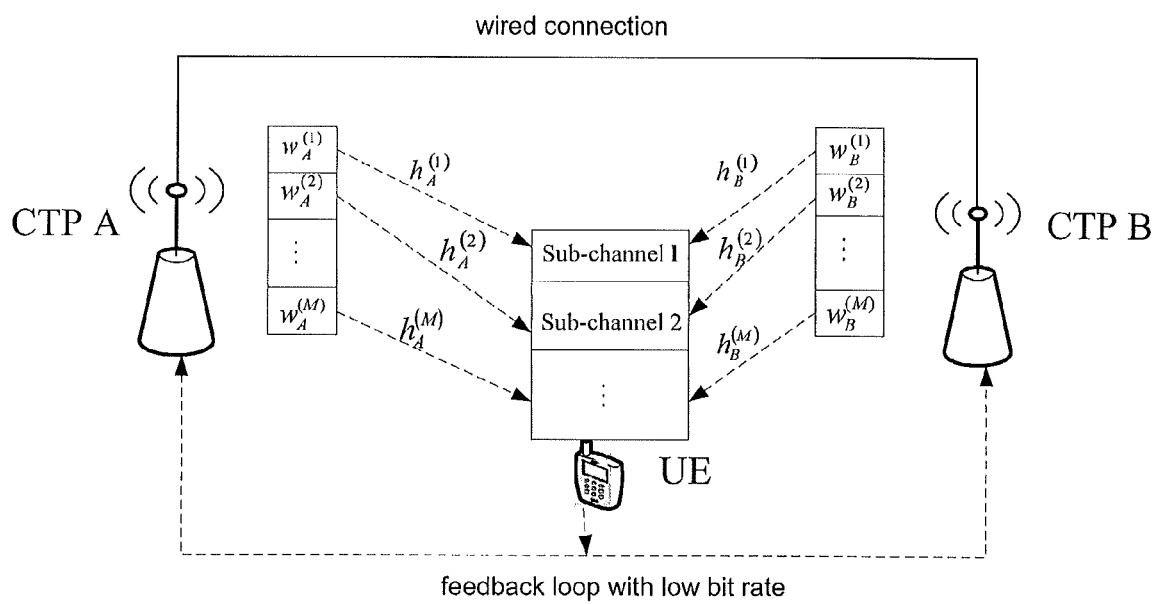
FIG. 3 is a diagram showing a cell deployment model in CoMP environment according to Embodiment 2 of the invention.
Figure 4:
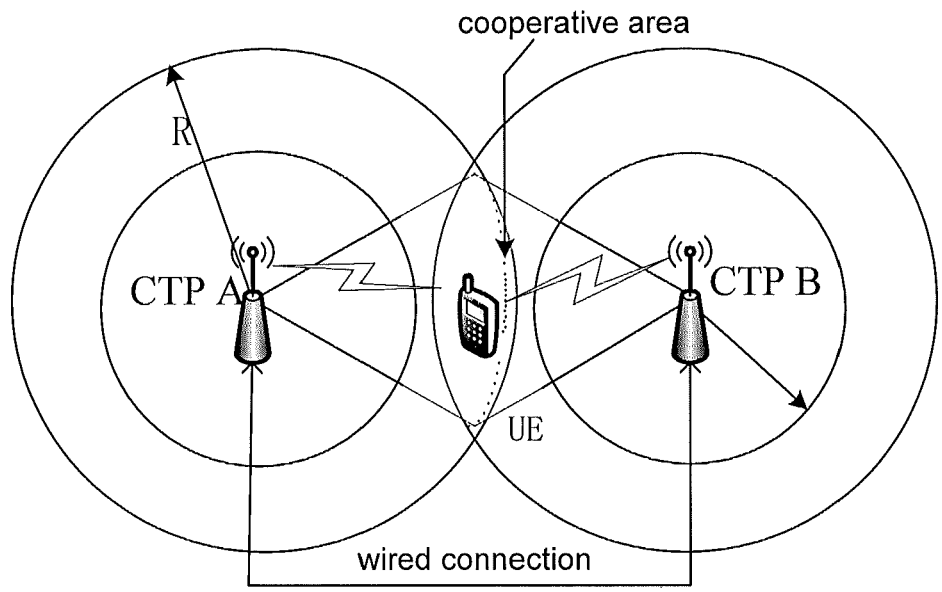
FIG. 4 is a diagram showing a cooperative area of the cell deployment model shown according to FIG. 3.

FIG. 3 is a diagram showing cell deployment model in CoMP environment according to Embodiment 2 of the present invention. Shown as FIG. 3, the model includes two CTPs with single antenna; the user terminal (hereafter referred to as UE) served by the two CTPs is a user terminal in a cooperative area which is showed specifically in FIG. 4. The two CTPs with single antenna are connected by a wired loop and can interact with each other in real time for exchanging their respective obtained channel state information and power allocation information. Therefore, each CTP has all information needed by the UE and sends information to the UE. CTPs determine power allocation jointly according to all their obtained channel state information from CTPs to the UE. The frequency band allocated to the UE by the system of the model comprises a plurality of sub-channels such as sub-channels 1 to M shown in FIG. 3.

Figure 5:
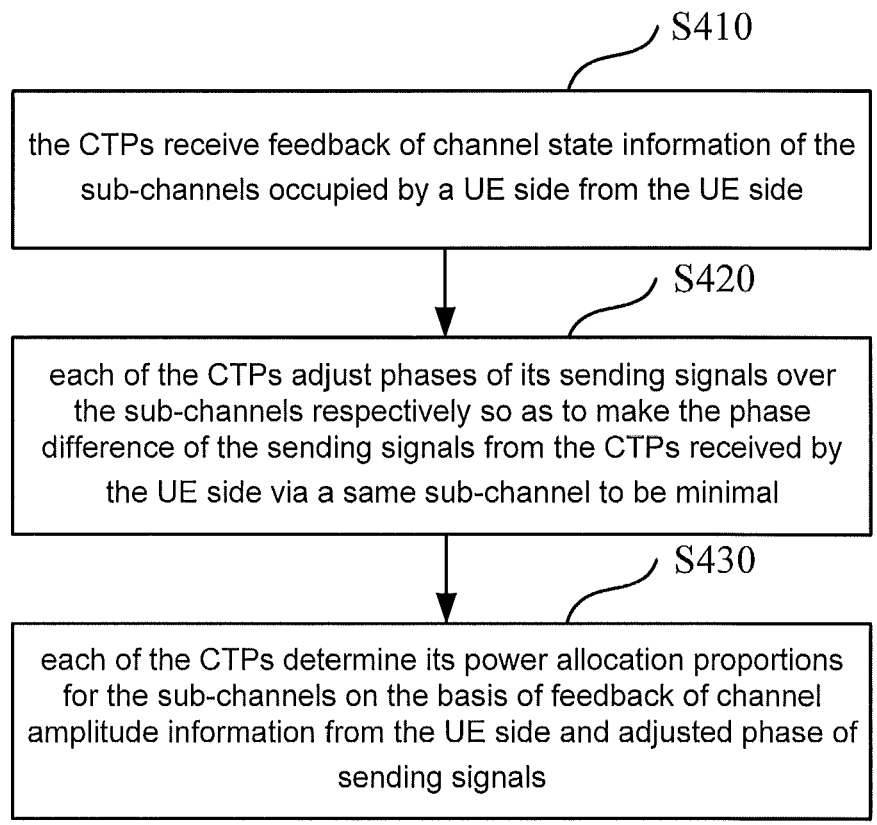
FIG. 5 is a flow diagram showing a method for allocating downlink transmission power in the coordinated multi-point transmission system according to Embodiment 2 of the present invention.

FIG. 5 is a flow diagram showing a method for allocating downlink transmission power in a coordinated multi-point transmission system according to Embodiment 2 of the present invention. Taking the cell deployment model shown in FIG. 3 as an example and referring to FIG. 5, steps of the present embodiment is described in detail as follows:

Step S410, CTPs receive feedback of channel state information of the sub-channels occupied by a UE side from the UE side.

In a frequency-division duplex (FDD) system, the channel state information needed by coordinated transmission is measured at UE side at first and then is reported to the CTPs by feedback loop with low bit rate. The feedback of channel state information from the UE side includes channel amplitude information and channel phase information, in which the channel amplitude information is the basis of implementing the power allocation method described in this embodiment of the present invention. In a time-division duplex (TDD) system, a sending side can obtain downlink channel information (corresponding to the channel state information) by using reciprocity of the uplink channel and the downlink channel.

According to the model of the present embodiment, the signal received by the UE side is shown by the expression as follows:

$$r^{(m)} = (w_A^{(m)} h_A^{(m)} + w_B^{(m)} h_B^{(m)}) s^{(m)} + n^{(m)} \quad (1)$$
$$m = 1, \ldots, M$$

$$h_A^{(m)} = \sqrt{\gamma_A^{(m)}} e^{j\varphi_A^{(m)}}, \quad (2)$$
$$h_B^{(m)} = \sqrt{\gamma_B^{(m)}} e^{j\varphi_B^{(m)}}$$
$$m = 1, \ldots, M$$

where $h_A^{(m)}$ and $h_B^{(m)}$ respectively represent channel state information of CTP A and CTP B over sub-channel m. $\gamma_A^{(m)}$ and $\gamma_B^{(m)}$ respectively represent channel power gain of CTP A and CTP B over sub-channel m. $\sqrt{\gamma_A^{(m)}}$ and $\sqrt{\gamma_B^{(m)}}$ respectively represent channel amplitude gain. $\phi_A^{(m)}$ and $\phi_B^{(m)}$ respectively represent channel phase of CTP A and CTP B over sub-channel m. Under the condition of flat fading and rich scattering, random variables $\phi_A^{(m)}$ and $\phi_B^{(m)}$ are subject to uniform distribution on the interval $[-\pi, \pi]$, $w_A^{(m)}$ and $w_B^{(m)}$ respectively represent weighted values of CTP A and CTP B over sub-channel m. $n^{(m)}$ is Additive Gaussian White Noise; $s^{(m)}$ represents signal transmitted by CTPs over sub-channel m; and assume that each of the CTPs uses a same transmission power $P_{Tx}$ i.e, as shown by the following formula:

$$E(|s^{(m)}|^2) = P_{Tx} \quad (3)$$

$$\sum_{m=1}^{M} |w_A^{(m)}|^2 = 1, \sum_{m=1}^{M} |w_B^{(m)}|^2 = 1 \quad (4)$$

Step S420, the CTPs adjust phases of sending signals over the sub-channels so as to make the phase difference of the sending signals from respective CTPs received by the UE side via a same sub-channel to be minimal.

In the present embodiment, preferably, CTP A is taken as a reference device, weighted phase of sending signal from CTP A observed by the UE side is taken as a reference phase, i.e. let $\angle w_A^{(m)} = 0$, m=1, ..., M, the object is to find a right weighted phase of sending signal $\angle w_B^{(m)} = \hat{\phi}^{(m)}$, m=1, ..., M of CTP B so as to satisfy the following formula:

$$\hat{\phi}^{(m)} = \arg\min_{\phi_m \in \rho_m} |[\varphi_A^{(m)} - \varphi_B^{(m)}] - \phi_m| \quad (5)$$

$$m = 1, \ldots, M$$

where $$\rho_m = \left\{ \frac{2n-1}{2^{N_p}} \pi : n = 1, 2, \ldots, 2^{N_p} \right\} \quad (6)$$

$\rho_m$ is the quantized phase set in phase cooperation; $N_p$ is the bit number of phase feedback of each of the sub-channels; arg min represents making the function get minimum value. By Step 420, the UE side can merge received signals from the sub-channels more efficiently and increase the signal-to-noise ratio of the received signals.

Step S430, each of the CTPs determines its power allocation proportions for sub-channels on the basis of feedback of channel amplitude information from the UEs and adjusted phase of sending signals.

Specifically, in Step S430, it is required to select right power allocation proportions $u_A^{(m)}$ and $u_B^{(m)}$ for each sub-channel, i.e. select right weighted value $w_A^{(m)}$ and $w_B^{(m)}$ to make the system reach maximum throughput.

let $|w_A^{(m)}|^2 = u_A^{(m)}$, $|w_B^{(m)}|^2 = u_B^{(m)}$, the system capacity can be shown as follows, where $$\gamma_{eA}^{(m)} = \frac{P_{Tx}}{N_0} \gamma_A^{(m)},$$

$$\gamma_{eB}^{(m)} = \frac{P_{Tx}}{N_0} \gamma_B^{(m)}$$

are equivalent channel power gain; $N_0$ is noise power value of each sub-channel.

$$C = \sum_{m=1}^{M} \log_2\left(1 + \frac{|w_A^{(m)} h_A^{(m)} + w_B^{(m)} h_B^{(m)}|^2 |s^{(m)}|^2}{N_0}\right) \quad (7)$$

$$= \sum_{m=1}^{M} \log_2\left(1 + \frac{P_{Tx}|w_A^{(m)} h_A^{(m)} + w_B^{(m)} h_B^{(m)}|^2}{N_0}\right)$$

$$= \sum_{m=1}^{M} \log_2\left(1 + \left|\sqrt{u_A^{(m)}} \sqrt{\gamma_{eA}^{(m)}} e^{j\varphi_A^{(m)}} + \sqrt{u_B^{(m)}} \sqrt{\gamma_{eB}^{(m)}} e^{j[\varphi_B^{(m)} + \hat{\phi}^{(m)}]}\right|^2\right)$$

$$= \sum_{m=1}^{M} \log_2(1 + u_A^{(m)} \gamma_{eA}^{(m)} + u_B^{(m)} \gamma_{eB}^{(m)} + 2\sqrt{u_A^{(m)}} \sqrt{\gamma_{eA}^{(m)}} \sqrt{u_B^{(m)}} \sqrt{\gamma_{eB}^{(m)}} \cos[\varphi_A^{(m)} - \varphi_B^{(m)} - \hat{\phi}^{(m)}])$$

The above question of making the system reach maximum throughput can be expressed as follows, where s.t. represents a constraint condition:

$$(u_A^{(m)}, u_B^{(m)}) = \arg\max_{\left(u_A^{(m)}, u_B^{(m)}\right)} C \quad (8)$$

$$\text{s.t.} \sum_{m=1}^{M} u_A^{(m)} = 1,$$

$$\sum_{m=1}^{M} u_B^{(m)} = 1,$$

$$u_A^{(m)} \geq 0,$$

$$u_B^{(m)} \geq 0,$$

$$m = 1, \ldots, M$$

According to bit number of the feedback of phase information $N_p$ over each sub-channel, two cases can be considered:

In the first case, the sub-channels have no feedback phase information bits in Step S420, i.e. $N_p = 0$.

In this case, a residual phase $\Delta^{(m)} = \phi_A^{(m)} - \phi_B^{(m)} - \hat{\phi}^{(m)}$, thus the residual phase is subject to uniform distribution on the interval $[-\pi, \pi]$. The statistical average value of the residual phase is $E(\cos(\Delta^{(m)})) = 0$, which is plugged into formula 7 and formula 8 so as to show the question of making the system reach maximum throughput as follows:

$$(u_A^{(m)}, u_B^{(m)}) = \arg\max_{\left(u_A^{(m)}, u_B^{(m)}\right)} C \quad (9)$$

$$C = \sum_{m=1}^{M} \log_2(1 + u_A^{(m)} \gamma_{eA}^{(m)} + u_B^{(m)} \gamma_{eB}^{(m)})$$

$$\text{s.t.} \sum_{m=1}^{M} u_A^{(m)} = 1,$$

$$\sum_{m=1}^{M} u_B^{(m)} = 1,$$

$$u_A^{(m)} \geq 0,$$

$$u_B^{(m)} \geq 0,$$

$$m = 1, \ldots, M$$

In the second case, bit number of the feedback of sub-channels is limited number but zero in Step S420, i.e. $N_p$ is a limited value but zero.

In this case, the residual phase $\Delta^{(m)} = \phi_A^{(m)} - \phi_B^{(m)} - \hat{\phi}^{(m)}$, thus the residual phase is subject to uniform distribution on the interval $$\left[-\frac{\pi}{2^{N_p}}, \frac{\pi}{2^{N_p}}\right).$$

The statistical average value of the residual phase is $$E(\cos(\Delta^{(m)})) = \frac{2^{N_p}}{\pi} \sin\left(\frac{\pi}{2^{N_p}}\right) = c_{N_p},$$

which is plugged into formula 7 and formula 8 so as to show the question of making the system reach maximum throughput as follows:

$$(u_A^{(m)}, u_B^{(m)}) = \arg\max_{\left(u_A^{(m)}, u_B^{(m)}\right)} C \quad (10)$$

-continued $$C = \sum_{m=1}^{M} \log_2\left(1 + u_A^{(m)}\gamma_{eA}^{(m)} + u_B^{(m)}\gamma_{eB}^{(m)} + 2\sqrt{u_A^{(m)}}\sqrt{\gamma_{eA}^{(m)}}\sqrt{u_B^{(m)}}\sqrt{\gamma_{eB}^{(m)}}\, c_{N_p}\right)$$

s.t. $\sum_{m=1}^{M} u_A^{(m)} = 1$, $\sum_{m=1}^{M} u_B^{(m)} = 1$, $u_A^{(m)} \geq 0$, $u_B^{(m)} \geq 0$, $m = 1, \ldots, M$ Based on the two cases described above, the embodiments of the invention come up with two kind of coordinate water filling power allocation methods. For detailed steps, please refer to FIG. 6 and FIG. 7.

Figure 6:
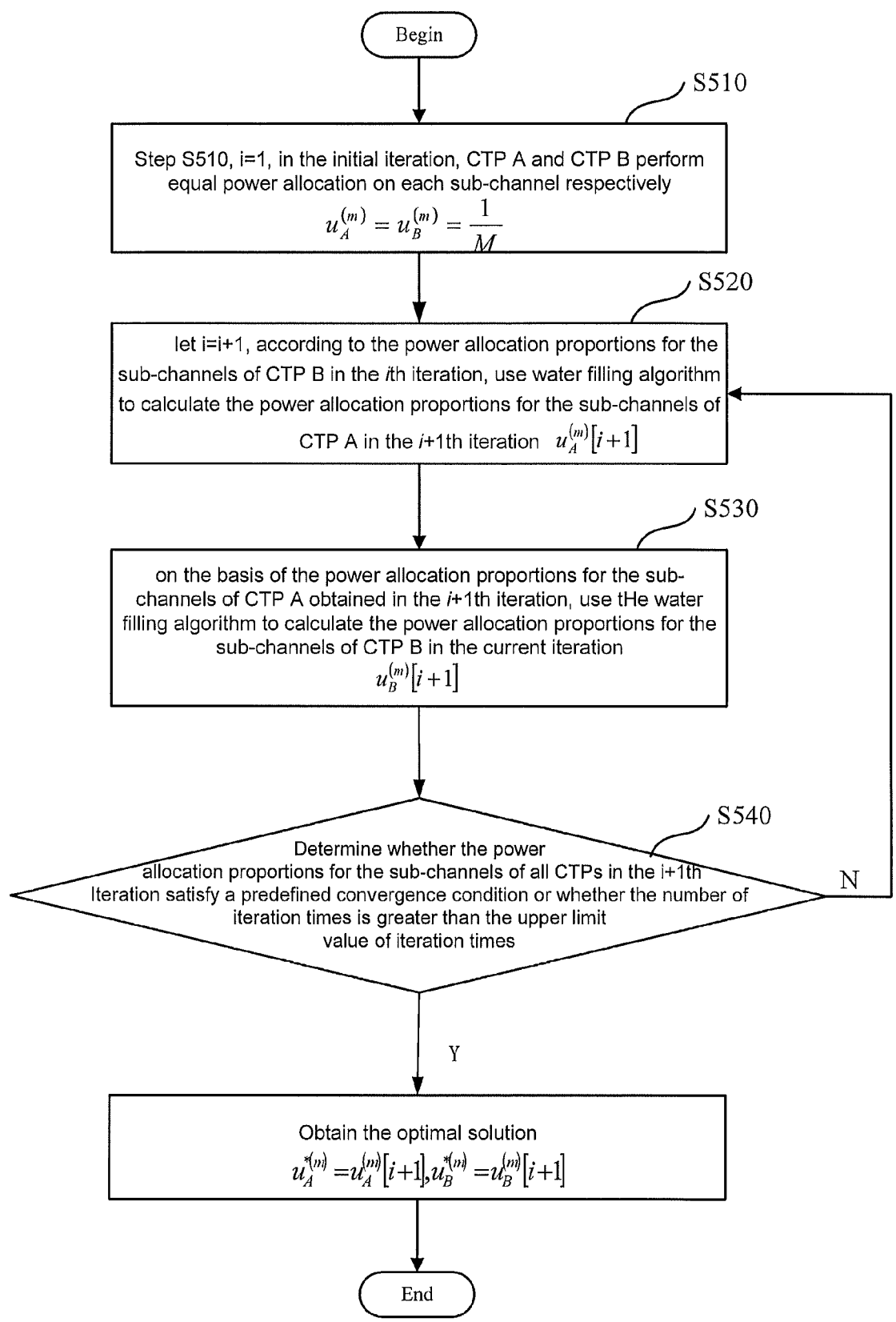
FIG. 6 is a flow diagram showing a method for allocating downlink transmission power in the coordinated multi-point transmission system when Np equals 0 according to Embodiment 2 of the present invention.

FIG. 6 is a flow diagram showing a method for allocating downlink transmission power in the coordinated multi-point transmission system when $N_p$ equals 0 (corresponding to the first case above). Referring to FIG. 6, steps of implementing the present solution is described in details as follows:

Step S510, i=1, with initial iteration, CTP A and CTP B perform equal power allocation on each sub-channel respectively, which is specifically shown by the following expression:

$$u_A^{(m)}[1] = \frac{1}{M}, \quad u_B^{(m)}[1] = \frac{1}{M} \quad (11)$$

$m = 1, \ldots, M$ where the number in square brackets represents power allocation iteration times i.

Step S520, let i=i+1, according to the power allocation proportions for the sub-channels of CTP B in the last (the ith) iteration, calculate the power allocation proportions for the sub-channels of CTP A in current (the i+1th) iteration by using water filling algorithm which is known to those skilled in the art.

i.e. for $\{u_B^{(m)}[i], m=1, \ldots, M\}$, CTP A select right $\{u_A^{(m)}[i+1], m=1, \ldots, M\}$ so as to make $$\max \sum_{m=1}^{M} \log_2(1 + u_A^{(m)}[i+1]\gamma_{eA}^{(m)} + u_B^{(m)}[i]\gamma_{eB}^{(m)}) \quad (12)$$

s.t. $u_A^{(m)}[i+1] \geq 0$, $\sum_{m=1}^{M} u_A^{(m)}[i+1] = 1$

Formula 12 is equivalent to the solution for the following convex optimization problem:

$$\min - \sum_{m=1}^{M} \log_2(\alpha^{(m)} + x^{(m)}) \quad (13)$$

$$\alpha^{(m)} = \frac{1 + u_B^{(m)}[i]\gamma_{eB}^{(m)}}{\gamma_{eA}^{(m)}} > 0$$

s.t. $x^{(m)} \geq 0$, $\sum_{m=1}^{M} x^{(m)} = 1$ where $x^{(m)}$ is the power allocation proportion allocated for sub-channel m by CTP A, min represents minimizing the solution of convex optimization problem in objective function formula 13, the following can be obtained on the basis of water filling theory:

$$x_*^{(m)} = \begin{cases} \dfrac{1}{v_A^*} - \alpha^{(m)} & v_A^* < \dfrac{1}{\alpha^{(m)}} \\ 0 & v_A^* \geq \dfrac{1}{\alpha^{(m)}} \end{cases} \quad (14)$$

where $$\frac{1}{v_A^*}$$

represents water filling line, which can satisfy the following formula:

$$\sum_{m=1}^{M} \max\left\{0, \frac{1}{v_A^*} - \alpha^{(m)}\right\} = 1 \quad (15)$$

The value of water filling line $$\frac{1}{v_A^*}$$

satisfying formula 15 can be obtained by using, for example, iterative water filling algorithm. Once the value of water filling line is obtained, the power allocation proportion $x_*^{(m)}$ allocated for sub-channel m by CTP A is obtained. Then let $u_A^{(m)}[i+1] = x_*^{(m)}$, so as to obtain the power allocation proportion for sub-channel m of CTP A in the current (i+1th) iteration.

Step S530, on the basis of the obtained power allocation proportions for the sub-channels of CTP A in the current (i+1th) iteration, calculate the power allocation proportions for the sub-channels of CTP B in the current iteration by using the water filling algorithm.

Specifically, for the obtained $\{u_A^{(m)}[i+1], m=1, \ldots, M\}$ in Step S520, CTP B selects right $\{u_B^{(m)}[i+1], m=1, \ldots, M\}$, so as to make $$\max \sum_{m=1}^{M} \log_2(1 + u_A^{(m)}[i+1]\gamma_{eA}^{(m)} + u_B^{(m)}[i+1]\gamma_{eB}^{(m)}) \quad (16)$$

s.t. $u_B^{(m)}[i+1] \geq 0$,

-continued $$\sum_{m=1}^{M} u_B^{(m)}[i+1] = 1$$

Formula 16 is equivalent to the solution for the following convex optimization problem:

$$\min - \sum_{m=1}^{M} \log_2(\beta^{(m)} + y^{(m)}) \quad (17)$$

$$\beta^{(m)} = \frac{1 + u_A^{(m)}[i+1]\gamma_{eA}^{(m)}}{\gamma_{eB}^{(m)}} > 0$$

$$\text{s.t. } y^{(m)} \geq 0,$$

$$\sum_{m=1}^{M} y^{(m)} = 1$$

where $y^{(m)}$ is the power allocation proportion allocated for sub-channel m by CTP B. Based on the water filling theory, the solution for convex optimization problem in formula 17 can be obtained as follows:

$$y_*^{(m)} = \begin{cases} \dfrac{1}{v_B^*} - \beta^{(m)} & v_B^* < \dfrac{1}{\beta^{(m)}} \\ 0 & v_B^* \geq \dfrac{1}{\beta^{(m)}} \end{cases} \quad (18)$$

where $$\frac{1}{v_B^*}$$

is water filling line, which satisfies the following formula 19:

$$\sum_{m=1}^{M} \max\left\{0, \frac{1}{v_B^*} - \beta^{(m)}\right\} = 1 \quad (19)$$

The value of water filling line $$\frac{1}{v_B^*}$$

satisfying formula 19 can be obtained by using the iterative water filling algorithm. Once the value of water filling line is obtained, the power allocation proportion $y_*^{(m)}$ allocated for sub-channel m by CTP B is obtained. Then let $u_B^{(m)}[i+1]= y_*^{(m)}$, so as to obtain the power allocation proportions of CTP B in the current (i+1th) iteration.

Step S540, determine whether the power allocation proportions for the sub-channels of the CTPs in the current (i+1th) iteration satisfy a predefined convergence condition.

Specifically, determine whether the current (i+1th) iteration satisfy the following predefined convergence condition:

$$\max_{m \in \{1, \ldots, M\}} \{|u_A^{(m)}[i+1] - u_A^{(m)}[i]|\} \leq \varepsilon_A \quad (20)$$

$$\max_{m \in \{1, \ldots, M\}} \{|u_B^{(m)}[i+1] - u_B^{(m)}[i]|\} \leq \varepsilon_B$$

Where $\varepsilon_A$ and $\varepsilon_B$ represent error tolerance limit of power allocation proportions defined for sub-channel m of CTP A and CTP B respectively. If the convergence condition of formula 20 is satisfied in the current (i+1th) iteration, the iteration operation is ended and the power allocation proportions of the coordinated transmission points respectively are $$u*_A^{(m)} = u_A^{(m)}[i+1], u*_B^{(m)} = u_B^{(m)}[i+1] \quad (21)$$

If the convergence condition of formula 20 is not satisfied in the current (i+1th) iteration, perform next iteration, i.e. go back to Step S520 and then repeat steps S520, S530 and S540. Iteration will not stop until formula 20 is satisfied or the number of iteration times is greater than the upper limit value of iteration times.

Figure 7:
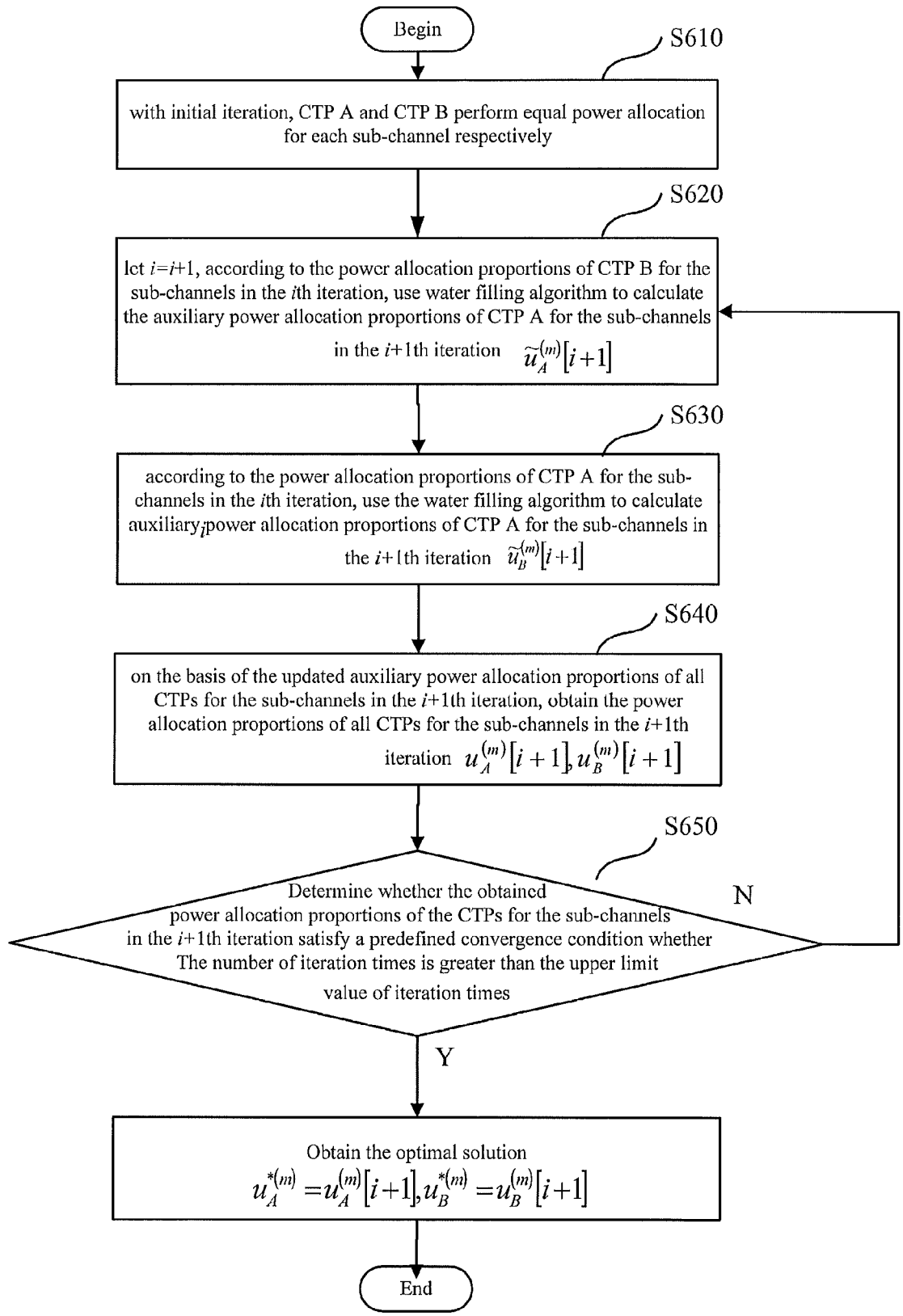
FIG. 7 is a flow diagram showing a method for allocating downlink transmission power in the coordinated multi-point transmission system when Np does not equal 0 according to Embodiment 2 of the present invention.

FIG. 7 is a flow diagram showing a method for allocating transmission power of coordinated multiple points when $N_p$ is a limited value but zero (corresponding to the second case); referring to FIG. 7, the steps for implementing the solution of the invention is given in details as follows:

Step S610, i=1, with initial iteration, CTP A and CTP B perform equal power allocation for each sub-channel respectively, which is specifically shown by the following expression:

$$u_A^{(m)}[1] = \frac{1}{M}, u_B^{(m)}[1] = \frac{1}{M} \quad m = 1, \ldots, M \quad (11)$$

where the number in square brackets represents power allocation iteration times i.

Step S620, let i=i+1, according to the power allocation proportions for the sub-channels of CTP B in the last (ith) iteration, calculate auxiliary power allocation proportions for the sub-channels of CTP A in the current (i+1th) iteration by using water filling algorithm.

i.e. for $\{u_B^{(m)}[i], m=1, \ldots, M\}$, CTP A selects right $\{\tilde{u}_A^{(m)}[i+1], m=1, \ldots, M\}$, so as to make $$\max \sum_{m=1}^{M} \log_2\left(1 + \tilde{u}_A^{(m)}[i+1]\gamma_{eA}^{(m)} + u_B^{(m)}[i]\gamma_{eB}^{(m)} + \right. \quad (22)$$

$$\left. 2\sqrt{\tilde{u}_A^{(m)}[i+1]} \sqrt{\gamma_{eA}^{(m)}} \sqrt{u_B^{(m)}[i]} \sqrt{\gamma_{eB}^{(m)}} c_{N_p}\right)$$

$$\text{s.t. } \tilde{u}_A^{(m)}[i+1] \geq 0, \sum_{m=1}^{M} \tilde{u}_A^{(m)}[i+1] = 1$$

In order to simplify calculation, the formula as follows can be obtained from first-order Taylor series expansion:

$$\sqrt{\tilde{u}_A^{(m)}[i+1]} \approx \sqrt{u_A^{(m)}[i]} + \frac{\tilde{u}_A^{(m)}[i+1] - u_A^{(m)}[i]}{2\sqrt{u_A^{(m)}[i]}} = \quad (23)$$

$$\frac{1}{2}\sqrt{u_A^{(m)}[i]} + \frac{1}{2}\frac{\tilde{u}_A^{(m)}[i+1]}{\sqrt{u_A^{(m)}[i]}}$$

Plug formula 23 into formula 22, a formula as follows can be obtained:

$$\min - \sum_{m=1}^{M} \log_2(\alpha^{(m)} + x^{(m)}) \quad (24)$$

$$\alpha^{(m)} = \frac{1 + u_B^{(m)}[i]\gamma_{eB}^{(m)} + \sqrt{u_A^{(m)}[i]u_B^{(m)}[i]} \sqrt{\gamma_{eA}^{(m)}\gamma_{eB}^{(m)}} c_{N_p}}{\gamma_{eA}^{(m)} + \sqrt{\frac{u_B^{(m)}[i]}{u_A^{(m)}[i]}} \sqrt{\gamma_{eA}^{(m)}\gamma_{eB}^{(m)}} c_{N_p}} > 0$$

$$\text{s.t. } x^{(m)} \geq 0, \sum_{m=1}^{M} x^{(m)} = 1$$

which has the same solution process as Step S520.

$$x_*^{(m)} = \begin{cases} \frac{1}{v_A^*} - \alpha^{(m)} & v_A^* < \frac{1}{\alpha^{(m)}} \\ 0 & v_A^* \geq \frac{1}{\alpha^{(m)}} \end{cases} \quad (14)$$

where $$\frac{1}{v_A^*}$$

is water filling line, which can satisfy formula 15 as follows:

$$\sum_{m=1}^{M} \max\left\{0, \frac{1}{v_A^*} - \alpha^{(m)}\right\} = 1 \quad (15)$$

Then let $\tilde{u}_A^{(m)}[i+1] = x_*^{(m)}$, so as to obtain the auxiliary power allocation proportions of CTP A in the i+1th iteration.

Step S630, according to the power allocation proportions for the sub-channels of CTP A obtained in the last (ith) iteration, auxiliary power allocation proportions for the sub-channels of CTP A in the current (i+1th) iteration are calculated by using the water filling algorithm.

i.e., for $\{u_A^{(m)}[i], m=1, \ldots, M\}$, CTP B selects right $\{\tilde{u}_B^{(m)}[i+1], m=1, \ldots, M\}$, so as to make $$\max \sum_{m=1}^{M} \log_2\left(1 + u_A^{(m)}[i]\gamma_{eA}^{(m)} + \tilde{u}_B^{(m)}[i+1]\gamma_{eB}^{(m)} + \right. \quad (25)$$

$$\left. 2\sqrt{u_A^{(m)}[i]} \sqrt{\gamma_{eA}^{(m)}} \sqrt{\tilde{u}_B^{(m)}[i+1]} \sqrt{\gamma_{eB}^{(m)}} c_{N_p}\right)$$

$$\text{s.t. } \tilde{u}_B^{(m)}[i+1] \geq 0, \sum_{m=1}^{M} \tilde{u}_B^{(m)}[i+1] = 1$$

In order to simplify calculation, from first-order Taylor series expansion, an expression as follows can be obtained:

$$\sqrt{\tilde{u}_B^{(m)}[i+1]} \approx \sqrt{u_B^{(m)}[i]} + \frac{\tilde{u}_B^{(m)}[i+1] - u_B^{(m)}[i]}{2\sqrt{u_B^{(m)}[i]}} = \quad (26)$$

-continued $$\frac{1}{2}\sqrt{u_B^{(m)}[i]} + \frac{1}{2}\frac{\tilde{u}_B^{(m)}[i+1]}{\sqrt{u_B^{(m)}[i]}}$$

Plug formula 26 into formula 25, a formula as follows can be obtained:

$$\min = \sum_{m=1}^{M} \log_2(\beta^{(m)} + y^{(m)}) \quad (27)$$

$$\beta^{(m)} = \frac{1 + u_A^{(m)}[i]\gamma_{eA}^{(m)} + \sqrt{u_B^{(m)}[i]u_A^{(m)}[i]} \sqrt{\gamma_{eA}^{(m)}\gamma_{eB}^{(m)}} c_{N_p}}{\gamma_{eB}^{(m)} + \sqrt{\frac{u_A^{(m)}[i]}{u_B^{(m)}[i]}} \sqrt{\gamma_{eA}^{(m)}\gamma_{eB}^{(m)}} c_{N_p}} > 0$$

$$\text{s.t. } y^{(m)} \geq 0, \sum_{m=1}^{M} y^{(m)} = 1$$

which has the same solution process as Step S520.

$$y_*^{(m)} = \begin{cases} \frac{1}{v_B^*} - \beta^{(m)} & v_B^* < \frac{1}{\beta^{(m)}} \\ 0 & v_B^* \geq \frac{1}{\beta^{(m)}} \end{cases} \quad (18)$$

where $$\frac{1}{v_B^*}$$

is water filling line, which can satisfy the following formula 19:

$$\sum_{m=1}^{M} \max\left\{0, \frac{1}{v_B^*} - \beta^{(m)}\right\} = 1 \quad (19)$$

Then let $\tilde{u}_B^{(m)}[i+1] = y_*^{(m)}$, so as to update the auxiliary power allocation proportion for sub-channel m of CTP A in the i+1th iteration.

Step S640, obtain the power allocation proportions for the sub-channels of all CTPs in the current iteration on the basis of the updated auxiliary power allocation proportions for the sub-channels of all CTPs in the current iteration and the auxiliary power allocation proportions for the sub-channels of all CTPs in the last (the ith) iteration.

Specially, the power allocation proportions of CTP A and CTP B in the i+1th iteration are obtained according to formula 28.

$$u_A^{(m)}[i+1] = u_A^{(m)}[i] + \delta(\tilde{u}_A^{(m)}[i+1] - u_A^{(m)}[i])$$

$$u_B^{(m)}[i+1] = u_B^{(m)}[i] + \delta(\tilde{u}_B^{(m)}[i+1] - u_B^{(m)}[i]) \quad (28)$$

Where δ is a convergence factor which is greater than 0. δ should be small enough to ensure convergence. The value of δ affects the speed of convergence. Under the premise of ensuring convergence, the greater the δ, the faster the convergence. Therefore the value of δ should have a right value in algorithm design. In the present embodiment, preferably, set the convergence factor δ=0.1.

It should be noted that an approximation made by using first-order Taylor series expansion is used in the process of calculating auxiliary power allocation proportions of coordinated transmission points A and B, therefore, the convergence factor is used to decrease step size of each iteration so as to ensure convergence.

Step S650, determine whether the obtained power allocation proportions for the sub-channels of the CTPs in the current (i+1th) iteration satisfy a predefined convergence condition.

Specifically, determine whether the obtained power allocation proportions of the CTP A and CTP B satisfy the convergence condition as follows:

$$\max_{m \in \{1,\ldots,M\}} \{|u_A^{(m)}[i+1] - u_A^{(m)}[i]|\} \leq \varepsilon_A \quad (20)$$

$$\max_{m \in \{1,\ldots,M\}} \{|u_B^{(m)}[i+1] - u_B^{(m)}[i]|\} \leq \varepsilon_B$$

Where $\varepsilon_A$ and $\varepsilon_B$ represent error tolerance limit of power allocation proportions defined for sub-channel m of CTP A and CTP B respectively. Preferably, in the embodiment, define the error tolerance limit of power allocation proportions of CTP A and CTP B to be $\varepsilon_A = \varepsilon_B = 0.001$ and set the upper limit value of iteration times to be 50.

If the convergence condition of formula 20 is satisfied in the current (i+1th) iteration, the iteration operation is ended and the power allocation proportions for the sub-channel m of the CTPs respectively are $$u^*_A{}^{(m)} = u_A^{(m)}[i+1], u^*_B{}^{(m)} = u_B^{(m)}[i+1] \quad (21)$$

If the convergence condition of formula 20 is not satisfied, perform next iteration, i.e. go back to Step S620 and repeat steps S620, S630 and S640; iteration does not stop until formula 20 is satisfied or the number of iteration times is greater than the upper limit value of iteration times.

Figure 8:
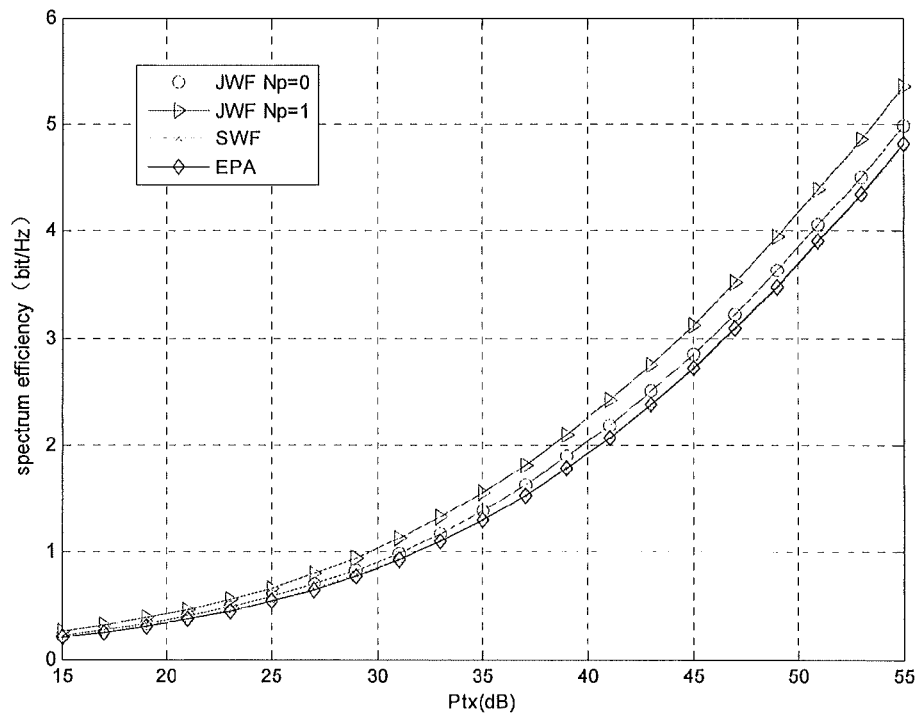
FIG. 8 is a simulation diagram of spectrum efficiency according to the embodiment shown according to FIG. 6 and FIG. 7 of the present invention.
Figure 9:
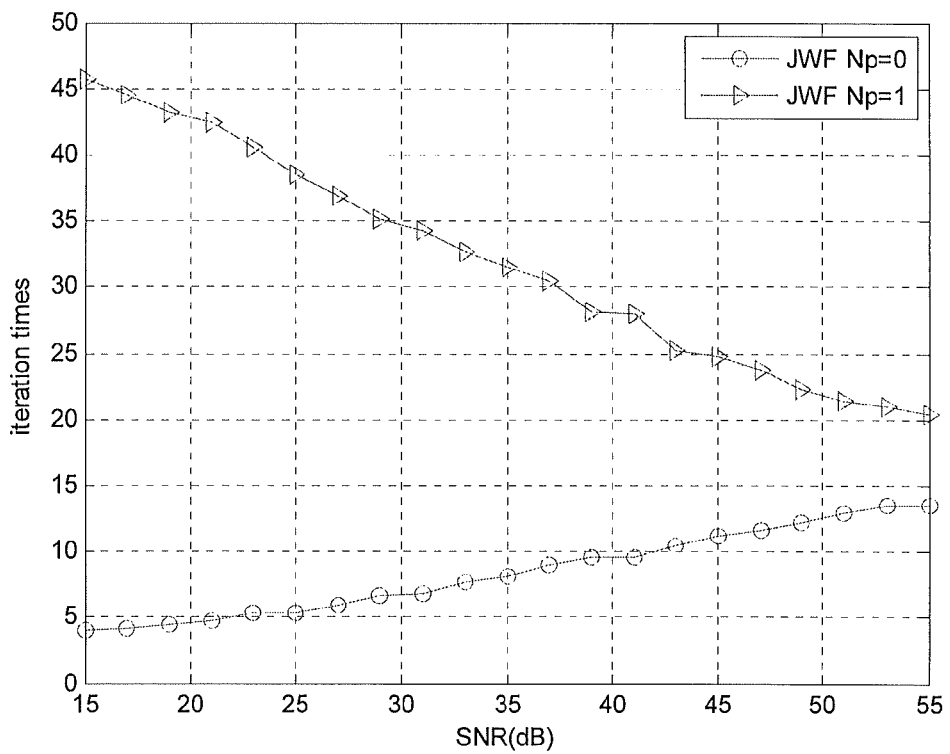
FIG. 9 is a simulation diagram of iteration times according to the embodiment shown according to FIG. 6 and FIG. 7 of the present invention.

FIG. 8 and FIG. 9 are simulation diagrams of the present embodiment. From the simulation diagrams, the method of the invention can perform power allocation on transmission channels more efficiently and has lower complexity in calculation.

Therefore, the present embodiment performs power allocation for downlink transmission channels in coordinated multiple points environment by adapting the coordinate Iterative Water filling Power Allocation Algorithm with low complexity, takes advantage of coordinated multiple point technology and improves the capacity of the system.

It will be appreciated by those skilled in the art that the modules and steps of the present invention described above can be implemented as a general purpose computing device, or be integrated on a single computing device, be distributed on a network of computing devices, or optically be implemented by program codes which are executable by a computing device so as to store them in a storage device of a computing device to execute, or to realized them as several integrated circuit modules, or realized a plurality of modules or steps above of them as a single integrated circuit module. In such way, the invention is not limited to any specified combination of hardware or software.

Specific embodiments of and examples for the invention are described above for illustrative purposes. The above detailed description of the embodiments of the invention is not to be exhaustive or limit the invention to the precise form disclosed above. Obviously, various variants and modifications are possible according to the above disclosure. The embodiments are chosen and described so that those skilled in the art can appreciate and understand the principles and practices of the present invention and alternatives and modifications. In fact, the scope of the invention is limited by the appended claims and equivalents thereof.

The invention claimed is:

1. A method for allocating downlink transmission power of coordinated transmission devices in a coordinated multipoint transmission system, the method comprising:

Step (S10), the coordinated transmission devices receiving feedback, from a terminal, channel state information of sub-channels occupied by the terminal, wherein the channel state information includes channel phase information and channel amplitude information, and each of the coordinated transmission device is for providing wireless access for the terminal in the coordinated multipoint transmission system;

Step (S20), each of the coordinated transmission devices adjusts phases of its sending signals over its sub-channels respectively so as to make a phase difference of the sending signals, which are received by the terminal from the coordinated transmission devices via a same sub-channel, to be; and Step (S30), each of the coordinated transmission devices determines its power allocation proportions for the sub-channels on the basis of feedback of channel amplitude information from the terminal and the adjusted phases of the sending signals, wherein, when a bit number of the feedback of the phase information of the sub-channels is zero, a power allocation proportions for the sub-channels of the coordinated transmission devices are determined by steps as follows:

Step (321), each of the coordinated transmission devices performing equal power allocation on its sub-channels so as to determine its power allocation proportions for the sub-channels;

Step (322), each of the coordinated transmission devices in turn determining their power allocation proportions for the sub-channels, on a basis of power allocation proportions for the sub-channels of other coordinated transmission devices before performing Step (322) this time, feedback of channel amplitude information from the terminal and an adjusted phase of sending signals;

Step (323), for each of the coordinated transmission devices, determining whether its power allocation proportions satisfy a predefined convergence condition respectively, when all of the coordinated transmission devices satisfy the predefined convergence condition, Step (S30) ends; otherwise, go back to Step (322) for performing next iteration.

2. The method of claim 1, wherein Step (20) further comprises taking one of the coordinated transmission devices as a reference device, wherein the reference device keeps the phases of sending signals to be constant; and other coordinated transmission devices except for the reference device adjusting the phase of their sending signals over the sub-channels so as to make the phase difference of the sending signals, which are received by the terminal from the coordinated transmission devices via a same sub-channel, to be a value.

3. The method of claim 2, wherein
other coordinated transmission devices except for the reference device determine a phase adjustment quantity of their sending signals over sub-channel m by using a following formula:

$$\hat{\phi}_K^{(m)} = \arg\min_{\phi_K^{(m)} \in \rho_m} |[\varphi_A^{(m)} - \varphi_K^{(m)}] - \phi_K^{(m)}|, \quad m = 1, \ldots, M$$

where, $$\rho_m = \frac{2n-1}{2^{N_P}}\pi, , \quad n = 1, 2, \ldots, 2^{N_P}$$

and $\rho_m$ is a quantized phase set; $N_p$ is a bit number of the feedback of phase information over the sub-channels; $\phi_A^{(m)}$ represents channel phase of reference device A over sub-channel m, $\phi_K^{(m)}$ represents channel phase over the sub-channel m of any coordinated transmission device K except for the reference device A, m is a sequence number of a sub-channel; M is the number of sub-channels; $\hat{\phi}_K^{(m)}$ is the phase adjustment quantity of sending signal over sub-channel m of coordinated transmission device K; arg min represents the value of $\phi_K^{(m)}$ which makes the function value to be a value.

4. The method of claim 1, wherein in Step (30), when a bit number of the feedback of the phase information of the sub-channels is zero, each of the coordinated transmission devices determines its power allocation proportions for its sub-channels by steps as follows:
Step (311), each of the coordinated transmission devices performing equal power allocation on its sub-channels so as to determine power allocation proportions of each of its sub-channels;
Step (312), each of the coordinated transmission devices in turn redetermining their power allocation proportions for its sub-channels, on the basis of current power allocation proportions for the sub-channels of other coordinated transmission devices and the feedback of channel amplitude information from the terminal;
Step (313), for each of the coordinated transmission devices, determining whether its power allocation proportions satisfy a predefined convergence condition, if all of the coordinated transmission devices satisfy the predefined convergence condition, Step (30) ends, otherwise, going back to Step (312) to perform next iteration.

5. The method of claim 4, wherein Step (312) further specifically comprises
each of the coordinated transmission devices determining its power allocation proportions for the sub-channels by a following expression:

$$u_K^{(m)} = \arg\max C$$

where a coordinated transmission device K refers to any one of the coordinated transmission devices;
$u_K^{(m)}$ represents power allocation proportion of coordinated transmission device K for sub-channel m, m is a sequence number of the sub-channels;
C represents throughput sent to the terminal by all of the coordinated transmission devices via sub-channel m and is a function of variable $u_K^{(m)}$ including following parameters: feedback of channel amplitude gain of sub-channel m from the terminal, current power allocation proportions for sub-channel m of other coordinated transmission devices except for coordinated transmission device K; arg max represents value of $u_K^{(m)}$ when a function value is maximum; and
for any coordinated transmission device, the sum of power allocation proportions for its sub-channels equals 1, and the power allocation proportion for any sub-channel is greater than or equal to 0.

6. The method of claim 5, wherein when the number of the coordinated transmission devices is 2, Step (312) specifically comprises
coordinated transmission device A being any one of the two coordinated transmission devices and determining its power allocation proportion for its sub-channels by the formula as follows:

$$u_A^{(m)} = \arg\max \sum_{m=1}^{M} \log_2(1 + u_A^{(m)}\gamma_{eA}^{(m)} + u_B'^{(m)}\gamma_{eB}^{(m)}),$$

another coordinated transmission device B determining its power allocation proportion for its sub-channels by a formula as follows:

$$u_B^{(m)} = \arg\max \sum_{m=1}^{M} \log_2(1 + u_B^{(m)}\gamma_{eB}^{(m)} + u_A^{(m)}\gamma_{eA}^{(m)}),$$

where $$u_B^{(m)} \geq 0, \sum_{m=1}^{M} u_B^{(m)} = 1, u_A^{(m)} \geq 0, \sum_{m=1}^{M} u_A^{(m)} = 1$$

$u_A^{(m)}$ represents a power allocation proportion for sub-channel m of coordinated transmission device A determined by executing Step (312) this time, $u_B^{(m)}$ and $u'_B^{(m)}$ respectively represent the power allocation proportion for sub-channel m of coordinated transmission device B determined by executing Step (312) and the power allocation proportion for sub-channel m of coordinated transmission device B before executing Step (312);

$$\gamma_{eA}^{(m)} = \frac{P_{Tx}}{N_0}\gamma_A^{(m)}, \gamma_{eB}^{(m)} = \frac{P_{Tx}}{N_0}\gamma_B^{(m)},$$

$\gamma_A^{(m)}$ and $\gamma_B^{(m)}$ respectively represent channel power gain; $P_{Tx}$ is transmission power of the coordinated transmission devices; $N_0$ represents noise power value over each sub-channel.

7. The method of claim 6, wherein a solution of $u_A^{(m)}$ of claim 6 is obtained by solving a equation as follows:

$$\min -\sum_{m=1}^{M} \log_2(\alpha^{(m)} + x^{(m)})$$

$$\alpha^{(m)} = \frac{1 + u_B'^{(m)}\gamma_{eB}^{(m)}}{\gamma_{eA}^{(m)}} > 0$$

$$\text{s.t. } x^{(m)} \geq 0, \sum_{m=1}^{M} x^{(m)} = 1$$

and the solution of $u_B^{(m)}$ of claim 6 is obtained by solving the equation as follows:

$$\min - \sum_{m=1}^{M} \log_2(\beta^{(m)} + y^{(m)})$$

$$\beta^{(m)} = \frac{1 + u_A^{(m)} \gamma_{eA}^{(m)}}{\gamma_{eB}^{(m)}} > 0$$

$$\text{s.t. } y^{(m)} \geq 0, \sum_{m=1}^{M} y^{(m)} = 1$$

where min represents minimizing the objective function, $x^{(m)}$ and $y^{(m)}$ respectively represent the power allocation proportions for sub-channel m of coordinated transmission device A and coordinated transmission device B.

8. The method of claim 1, wherein Step (322) specifically further comprises:
coordinated transmission device K, which is any one of the coordinated transmission devices, redetermining its power allocation proportion for the sub-channels by a following process:
determining $\tilde{u}_K^{(m)}$ by the following expression:

$$\tilde{u}_K^{(m)} = \arg\max C,$$

then performing convergence on $\tilde{u}_K^{(m)}$ according to a defined expression so as to determine power allocation proportions for the sub-channels of coordinated transmission device K, where m is a sequence number of the respective channels, C represents throughput sent to the terminal via sub-channel m and is a function of variable $\tilde{u}_K^{(m)}$ including following parameters: feedback of channel amplitude gain of sub-channel m from the terminal, power allocation proportions for sub-channel m of other coordinated transmission devices except for coordinated transmission device K before performing Step (322) and an adjusted phase of sending signals; and $$\sum_{m}^{M} \tilde{u}_K^{(m)} = 1$$

and $\tilde{u}_K^{(m)} \geq 0$

9. The method of claim 8, wherein when the number of coordinated transmission devices is 2, the expression in claim 9 specifically further comprises $$\tilde{u}_A^{(m)} = \arg\max \sum_{m=1}^{M} \log_2\left(1 + \tilde{u}_A^{(m)} \gamma_{eA}^{(m)} + u_B'^{(m)} \gamma_{eB}^{(m)} + 2\sqrt{\tilde{u}_A^{(m)}} \sqrt{\gamma_{eA}^{(m)}} \sqrt{u_B'^{(m)}} \sqrt{\gamma_{eB}^{(m)}} c_{N_p}\right)$$

where $$\tilde{u}_A^{(m)} \geq 0, \sum_{m=1}^{M} \tilde{u}_A^{(m)} = 1$$

and a coordinated transmission device A is any one of the two coordinated transmission devices; $u'_B{}^{(m)}$ represents the power allocation proportion for sub-channel m of coordinated transmission device B determined before executing Step (322) this time, $\tilde{u}_A^{(m)}$ is the value of $u_A^{(m)}$ to be determined by executing Step (322) this time;

$$\gamma_{eA}^{(m)} = \frac{P_{Tx}}{N_0} \gamma_A^{(m)}, \gamma_{eB}^{(m)} = \frac{P_{Tx}}{N_0} \gamma_B^{(m)},$$

$\gamma_A^{(m)}$ and $\gamma_B^{(m)}$ respectively represent channel power gain; $P_{Tx}$ is transmission power of respective coordinated transmission devices; $c_{N_p}$ is a function including parameter of adjusted phase of sending signals, $$c_{N_p} = E\left(\cos(\varphi_A^{(m)} - \varphi_B^{(m)} - \hat{\phi}^{(m)})\right) = \frac{2^{N_p}}{\pi} \sin\left(\frac{\pi}{2^{N_p}}\right),$$

$N_0$ represents noise power value over each sub-channel.

10. The method of claim 9, wherein the solution of $\tilde{u}_A^{(m)}$ of claim 10 is obtained by solving a equation as follows:

$$\min - \sum_{m=1}^{M} \log_2(\alpha^{(m)} + x^{(m)})$$

$$\alpha^{(m)} = \frac{1 + u_B'^{(m)} \gamma_{eB}^{(m)} + \sqrt{u_A'^{(m)} u_B'^{(m)}} \sqrt{\gamma_{eA}^{(m)} \gamma_{eB}^{(m)}} c_{N_p}}{\gamma_{eA}^{(m)} + \sqrt{\frac{u_B'^{(m)}}{u_A'^{(m)}}} \sqrt{\gamma_{eA}^{(m)} \gamma_{eB}^{(m)}} c_{N_p}} > 0$$

where $$x^{(m)} \geq 0, \sum_{m=1}^{M} x^{(m)} = 1,$$

and coordinated transmission device A is any one of the two coordinated transmission devices; $u'_A{}^{(m)}$ and $u'_B{}^{(m)}$ respectively are the power allocation proportions for sub-channel m of coordinated transmission devices A and B before executing Step (322) this time; $x^{(m)}$ represents the value of $\tilde{u}_A^{(m)}$ which is determined by executing Step (322) this time, min represents minimizing the objective function.

11. The method of claim 8, wherein Step (322) further comprises
performing convergence on $\tilde{u}_K^{(m)}$ according to a defined expression so as to determine power allocation proportions for sub-channels of coordinated transmission device K:

$$u_K^{(m)} = u'_K{}^{(m)} + \delta(\tilde{u}_K^{(m)} - u'_K{}^{(m)})$$

where $u_K^{(m)}$ represents power allocation proportion for the mth sub-channel of (in) coordinated transmission device K, $u'_K{}^{(m)}$ represents power allocation proportion for the sub-channel of coordinated transmission device K which is determined before executing Step (322) this time, S is a convergence factor which is less than 1.

12. The method of claim 4, wherein the value of $u_K^{(m)}$ is determined by water filling theory and the value of $\tilde{u}_K^{(m)}$ is determined by a Taylor formula and a water filling theory.

13. The method of claim 4, wherein a predefined convergence condition is $$\max_{m\in\{1,\ldots,M\}}\{|u^{(m)} - u'^{(m)}|\} \leq \varepsilon$$

where $\epsilon$ represents error tolerance limit defined for power allocation proportion, $u^{(m)}$ represents current power allocation proportion for sub-channel m of a coordinated transmission device; $u'^{(m)}$ represents power allocation proportion for sub-channel m, which is determined before executing Step (312) or Step (322) this time; $\|$ represents Modular operation.

\* \* \* \* \*